(12) United States Patent
Yoshimori et al.

(10) Patent No.: US 7,264,382 B2
(45) Date of Patent: Sep. 4, 2007

(54) LIGHT PROJECTOR

(75) Inventors: Norihito Yoshimori, Tokyo (JP); Makoto Kiriyama, Tokyo (JP)

(73) Assignee: Light Boy Co., Ltd., Tokyo (JP)

( * ) Notice: Subject to any disclaimer, the term of this patent is extended or adjusted under 35 U.S.C. 154(b) by 231 days.

(21) Appl. No.: 10/477,994

(22) PCT Filed: May 21, 2002

(86) PCT No.: PCT/JP02/04905

§ 371 (c)(1),
(2), (4) Date: Nov. 17, 2003

(87) PCT Pub. No.: WO02/095288

PCT Pub. Date: Nov. 28, 2002

(65) Prior Publication Data

US 2004/0170022 A1 Sep. 2, 2004

(30) Foreign Application Priority Data

May 21, 2001 (JP) .............................. 2001-150911

(51) Int. Cl.
*F21V 17/06* (2006.01)
(52) U.S. Cl. ........................ 362/431; 362/352; 362/363
(58) Field of Classification Search ................ 362/352, 362/96, 253, 806, 399, 276, 363, 250, 385
See application file for complete search history.

(56) References Cited

U.S. PATENT DOCUMENTS 6,012,826 A * 1/2000 Chabert ...................... 362/363
6,238,067 B1 * 5/2001 Hirsch ........................ 362/352
6,290,377 B1 * 9/2001 Hulse ......................... 362/385
6,305,827 B1 * 10/2001 Nolle ......................... 362/352
2003/0137840 A1 * 7/2003 Citron et al. ............... 362/250

FOREIGN PATENT DOCUMENTS

| JP | 4859386 | 7/1973 |
| JP | 4888781 | 11/1973 |
| JP | 673801 | 10/1994 |
| JP | 09306210 | 11/1997 |
| JP | 1061877 | 3/1998 |
| JP | 2000-195328 | 7/2000 |
| JP | 2000-222931 | 8/2000 |

* cited by examiner

*Primary Examiner*—Sandra O'Shea
*Assistant Examiner*—Anabel Ton
(74) *Attorney, Agent, or Firm*—Dykema Gossett PLLC

(57) ABSTRACT

A light projector includes a power generator 6; a bogie 1 for mounting the power generator 6; an extendable or retractable supporting column 2 vertically installed at the bogie 1; a balloon 4 arranged at an upper end of the extendable or retractable supporting column 2; and a lighting instrument 3 stored in the balloon 4, wherein the power generator 6 and the lighting instrument 3 can be electrically energized. The lighting instrument 3 is lit through supply of electricity from the power generator 6 installed at the bogie 1 and the light thus generated is changed into a soft-feeling light through the balloon 4 so as to enable the light to be projected in an outward entire circumferential direction of the balloon 4. Thus, even if the light projector is used as a night-time lighting for a road work and the like, the light of the lighting instrument can be radiated in a wide range without causing a driver of a passing vehicle to feel its glaring effect.

6 Claims, 10 Drawing Sheets

LIGHT PROJECTOR

TECHNICAL FIELD

This invention relates to a light projector used as a nighttime lighting unit applied in a work site, a game ground and a camp or the like. More particularly, this invention relates to a light projector which can be effectively used as a nighttime lighting unit for a road construction or the like, for example, by radiating light from a light source indirectly and reducing a lighting glare.

BACKGROUND ART

It is well known in the prior art to provide a light projector in which a desired number of spot-light type lighting instruments for use in radiating light of a lamp (an electrical bulb) in a forward direction by a reflector are installed at an upper end of an extendable or retractable supporting column vertically installed at a bogie for use in mounting a power generator.

In this type of light projector, it is of course apparent that the light (projected light) radiated from the aforesaid lighting instrument is bright to cause a worker at site to easily perform the work there. However, when this is applied at a nighttime road construction work, there occurs a possibility that the projected light is too bright for a driver of running vehicle and in particular, this may cause a troublesome state at the work site such as a highway and the like. In addition, the light radiated from the aforesaid lighting instrument is limited only in a forward direction as to the light projecting direction with a reflector, so that its light projecting range becomes narrow and it becomes a disadvantage that a plurality of light projectors are required in the case that the work area is wide.

This invention has been invented in view of the prior art circumstances and it is an object of this invention to provide a new light projector in which no glaring is felt by a driver and the light can be radiated in a wide range.

DISCLOSURE OF THE INVENTION

In order to accomplish the aforesaid object, the light projector of the present invention is comprised of a power generator; a bogie for mounting the power generator; an extendable or retractable supporting column vertically installed at the bogie; a balloon arranged at an upper end of the extendable or retractable supporting column; and a lighting instrument stored in the balloon, and characterized in that the power generator and the lighting instrument can be electrically energized.

In accordance with the light projector of this invention constituted as described above, when the lighting instrument is lit, the light is changed into a soft-feeling light through the balloon so as to enable the light to be projected in an outward entire circumferential direction, so that it is possible to radiate the light over a wide range without causing a driver to feel glare.

In addition, this invention is constructed such that the aforesaid lighting instrument is comprised of an electric bulb, a frame body for holding the electric bulb and a balloon expanding means for expanding the balloon, and characterized in that there are provided an upper supporting member and a lower supporting member for holding the balloon, and the frame body is held by the upper supporting member and the lower supporting member.

In such a construction as described above, the balloon is rigidly fixed to the main body, so that the bulged-out state of the balloon can be kept tightly.

Further, this invention is characterized in that the upper supporting member and the lower supporting member are comprised of an inner plate arranged inside the balloon and an outer plate arranged outside the balloon, and an optional part of the balloon is held by these inner plate and outer plate.

In such a configuration as above, this invention provides a fixed structure in which an opposing portion in the balloon is held by the surfaces of the inner plate and the outer plate, so that there is no possibility that the balloon is broken or has a punctured hole at the fixed portion and the balloon can be held tightly.

Further, this invention is characterized in that the frame body is comprised of a plurality of supporting columns raised between the upper part and the lower part of the frame body.

In such a configuration as above, the frame body becomes a rigid structure comprised of a plurality of supporting columns.

In addition, this invention is characterized in that each of the supporting columns of the frame body is comprised of at least a first column and a second column having a smaller diameter than that of the first column and the second column is slidably inserted into the first column.

In such a configuration as above, each of the second columns is slid and its sliding motion is restricted at optional position to enable a length of the frame body to be optionally adjusted.

Further, this invention is characterized in that the balloon is comprised of an upper surface part, a barrel part and a lower surface part, and both the upper surface part and the lower surface part are provided with an engagement means to cause the barrel part to be engaged or disengaged.

In such a configuration as above, the barrel part of the balloon can be easily removed by operating the engagement means.

Further, this invention is characterized in that one or a plurality of covering films with light-shielding characteristic are formed at optional portions outside the balloon in such a way that they are removably and properly installed.

In such a configuration as above, the covering films are installed at optional locations outside the balloon to enable light radiated from a lighting instrument to be partially shielded and a light projecting range to be properly set.

Further, this invention is characterized in that one or a plurality of louvers or covering plates having a light shielding characteristic are installed in such a way that they can be opened or closed or engaged or disengaged.

In such a configuration as above, an optional louver fixed around the barrel part of the frame body is opened or closed or the shielding plates are installed at optional locations around the frame body to enable light radiated from the lighting instrument to be partially shielded and a light projecting range to be properly set.

BEST MODE FOR CARRYING OUT THE INVENTION

Referring now to the accompanying drawings, a preferred embodiment of this invention will be described.

Figure 1:
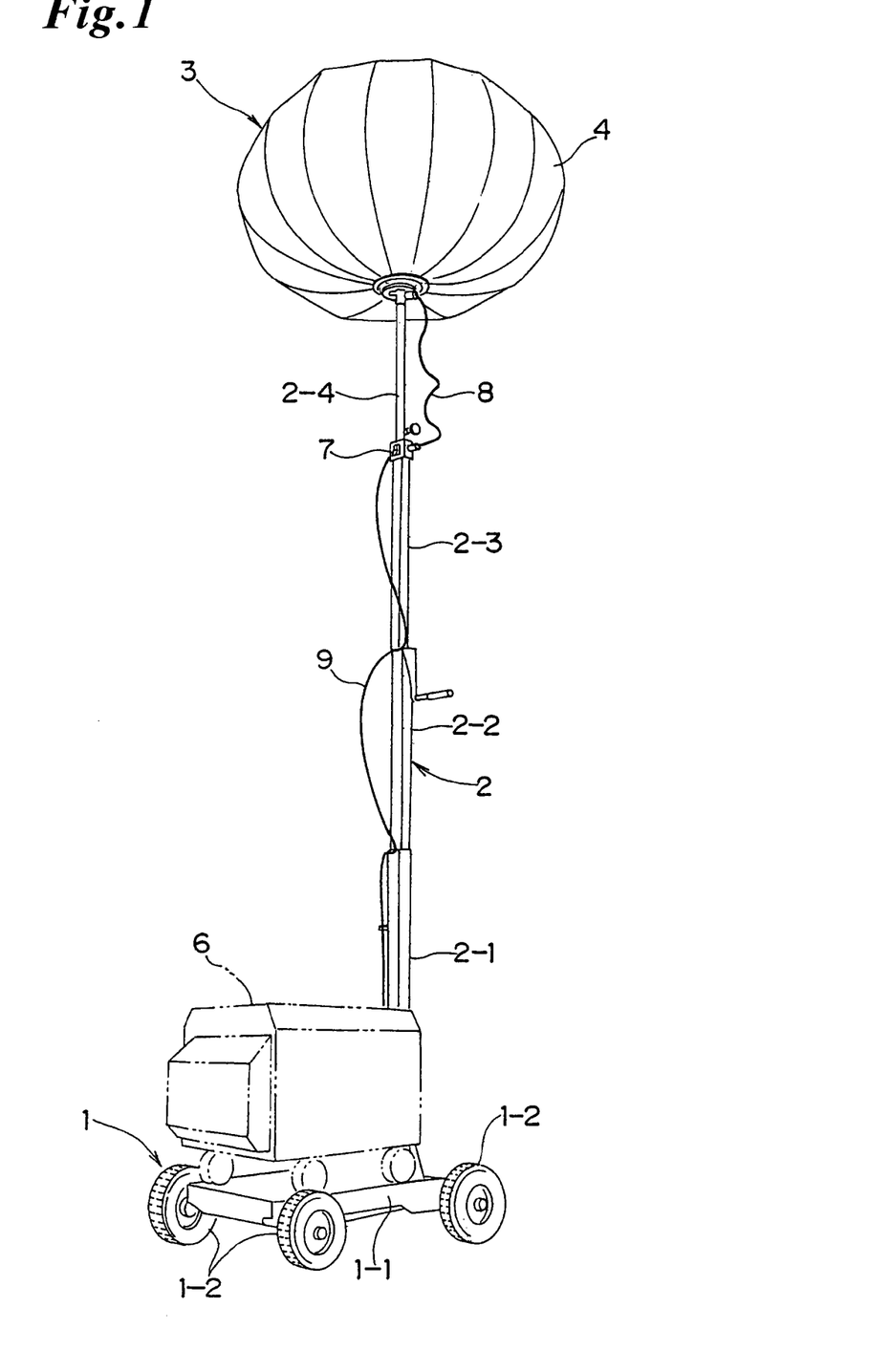
FIG. 1 is a perspective view for showing one preferred embodiment of a light projector of this invention.

FIG. 1 is a perspective view for showing one preferred embodiment of a light projector of this invention. This light projector A is comprised of a power generator 6; a bogie 1 for mounting the power generator 6; an extendable or retractable supporting column 2 vertically installed at the bogie 1; a balloon 4 installed at the upper end of the extendable or retractable supporting column 2; and a lighting instrument 3 having at least an electric bulb 5 stored in this balloon 4. This light projector is configured such that the power generator 6 and the lighting instrument 3 can be electrically energized to cause the lighting instrument 3 to be lit through electrical supplying from the power generator 6, glaring light supplied from the electric bulb 5 is passed through the balloon 4 and changed into a soft light not showing any glaring state and the light can be projected in an outer entire circumferential direction of the balloon 4.

The bogie 1 is constructed such that wheels 1-2 are rotationally supported at front, rear, right and left portions of a vehicle body base 1-1, a power generator 6 having wheels is removably mounted on the bogie and at the same time the extendable or retractable supporting column 2 is vertically installed at the rear part.

It is of course available that the power generator 6 has no wheels at all and the power generator 6 is removably mounted on or fixed on the bogie 1 and so this installing state is not specifically restricted.

The extendable or retractable supporting column 2 is formed such that a main base column 2-1 is vertically installed at an upper surface of a rear part of the bogie 1, at least one hollow tube column having its inner diameter gradually decreased against the main base column 2-1 and two middle tube columns 2-2, 2-3 as seen in FIG. 1 are freely fitted in sequence into the main base column 2-1 in such a way that the hollow tube columns can be slid in an upward or downward direction, and these middle tube columns 2-2, 2-3 are slid up and down in sequence by a well-known ascending or descending means, thereby a height of the lighting instrument 3 can be properly changed and set.

Then, a connecting column 2-4 at the upper-most stage is removably inserted into the upper end of the middle tube column 2-3 through a joint member 7 and connected to it, thereby the lighting instrument 3 can be installed.

A plug for a cable 9 electrically energizing the power generator 6 and a plug for a cable 8 electrically energizing the lighting instrument 3 are inserted into the joint member 7, thereby the power generator 6 and the lighting instrument 3 are electrically connected in such a way that they can be electrically energized, the electric bulb 5 is lit with electricity supplied from the power generator 6 and at the same time an air suction device 10 to be described later is operated.

Although the ascending or descending means for sliding up and down each of the middle tube columns 2-2, 2-3 is not restricted in particular, it can be illustrated as examples to provide one configuration in which the extremity end of a wire wound around a winch arranged at the main base tube column 2-1, for example, is connected to the middle tube column 2-3 and at the same time, a middle portion of the wire is applied to pulleys arranged at the middle tube columns 2-2, 2-3 and each of the middle tube columns 2-2, 2-3 is ascended or descended by taking-up or feeding out the wire through the winch, or the other configuration in which an operation for ascending or descending each of the middle tube columns 2-2, 2-3 can be performed manually under utilization of a repelling force of a gas damper assembled into the base main column 2-1.

In addition, a cable 9 supplied from the power generator 6 is partially supported at the extendable or retractable supporting column 2. When an operation for ascending each of the middle tube columns 2-2, 2-3 is carried out against the base main column 2-1, the cable 9 is extended by each of the supporting portions and in turn when an operation for descending each of the middle tube columns 2-2, 2-3 is carried out, the cable 9 is collected in a loop shape.

Figure 2:
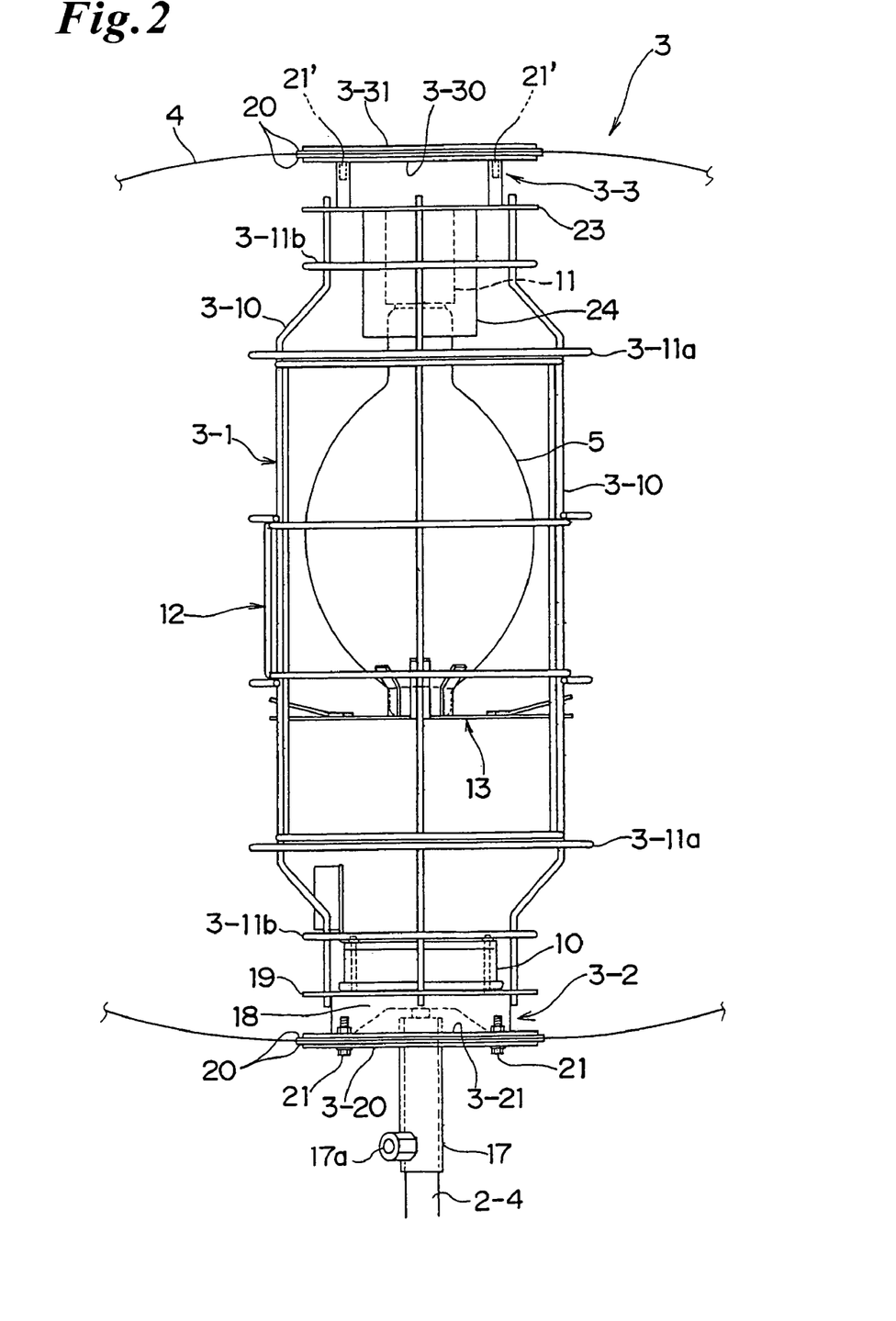
FIG. 2 is an enlarged longitudinal sectional view for showing a central part of a balloon.
Figure 3:
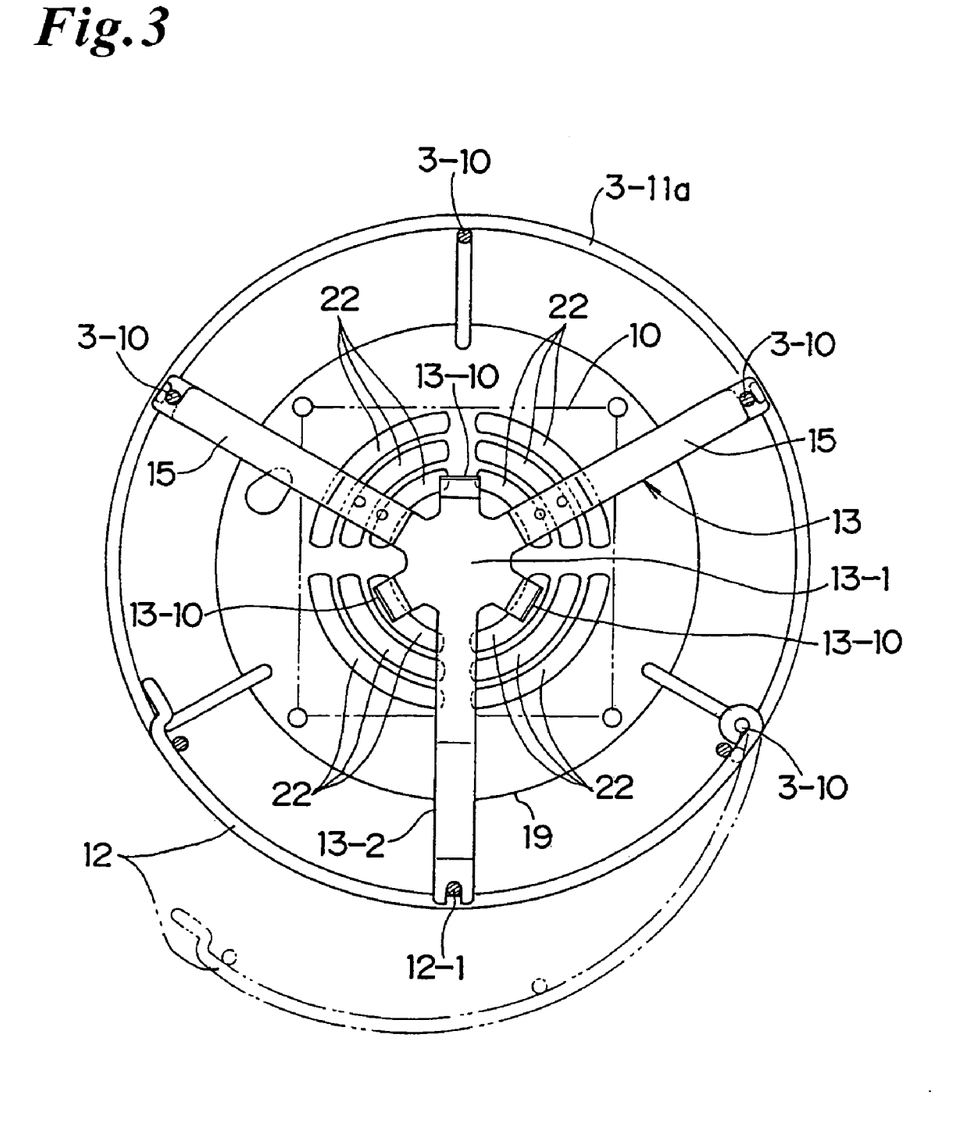
FIG. 3 is a top plan view in cross section for showing a frame body of the lighting instrument.

As shown in FIGS. 2 and 3, the lighting instrument 3 is comprised of a frame body 3-1 assembled in a grid manner, formed in a substantial cylindrical shape and storing the electric bulb 5; a lower supporting member 3-2 fixed to the lower part of the frame body 3-1; an upper supporting member 3-3 fixed to an upper part of the frame body 3-1; an air suction device 10 arranged above the lower supporting member 3-2; and a socket 11 with the electric bulb 5 being installed to be faced downward. The frame body 3-1 is vertically arranged and fixed at the upper end of the extendable or retractable supporting column 2 by the lower supporting member 3-2, the balloon 4 is held by the lower supporting member 3-2 and the upper supporting member 3-3, the frame body 3-1 is held by the lower supporting member 3-2 and the upper supporting member 3-3 and then the opposing location of the balloon 4 is fixed to the frame body 3-1.

The frame body 3-1 is made such that several upward rods 3-10 of metallic wire material having a desired rigidity and having upper and lower ends bent at a proper length are arranged around the electric bulb 5 and at the same time a plurality of ring rods 3-11a having a larger diameter than that of the electric bulb 5 are fixed to enclose these upward rods 3-10, a plurality of ring rods 3-11b having a smaller diameter than that of the ring rods 3-11a are fixed to enclose the portions drawn inside the upper part and the lower part of the upward rods 3-10 and frame assembled into a substantial cylindrical shape with the upper and lower ends being drawn.

In addition, a substantial central part of the frame body 3-1 is formed with an opening or closing door 12 for replacing the electric bulb 5 and at the same time the bulb holder 13 slidably engaged with each of the upward rods 3-10 in an upward or downward direction is installed inside the frame body 3-1.

The opening or closing door 12 is frame assembled to have a size under application of the same metallic wire material as that of the frame body 3-1 over a substantial entire length in a height direction by about ⅓ in a circumferential direction in respect to the outer circumferential part of the frame body 3-1, the door is installed at an opening part formed at the outer circumferential part of the frame body 3-1 in the same size as that of the opening or closing door 12 in such a way that the door can be opened only at one side thereof and when a filament at the bulb 5 is cut, a replacement of the bulb can be easily carried out.

Figure 4:
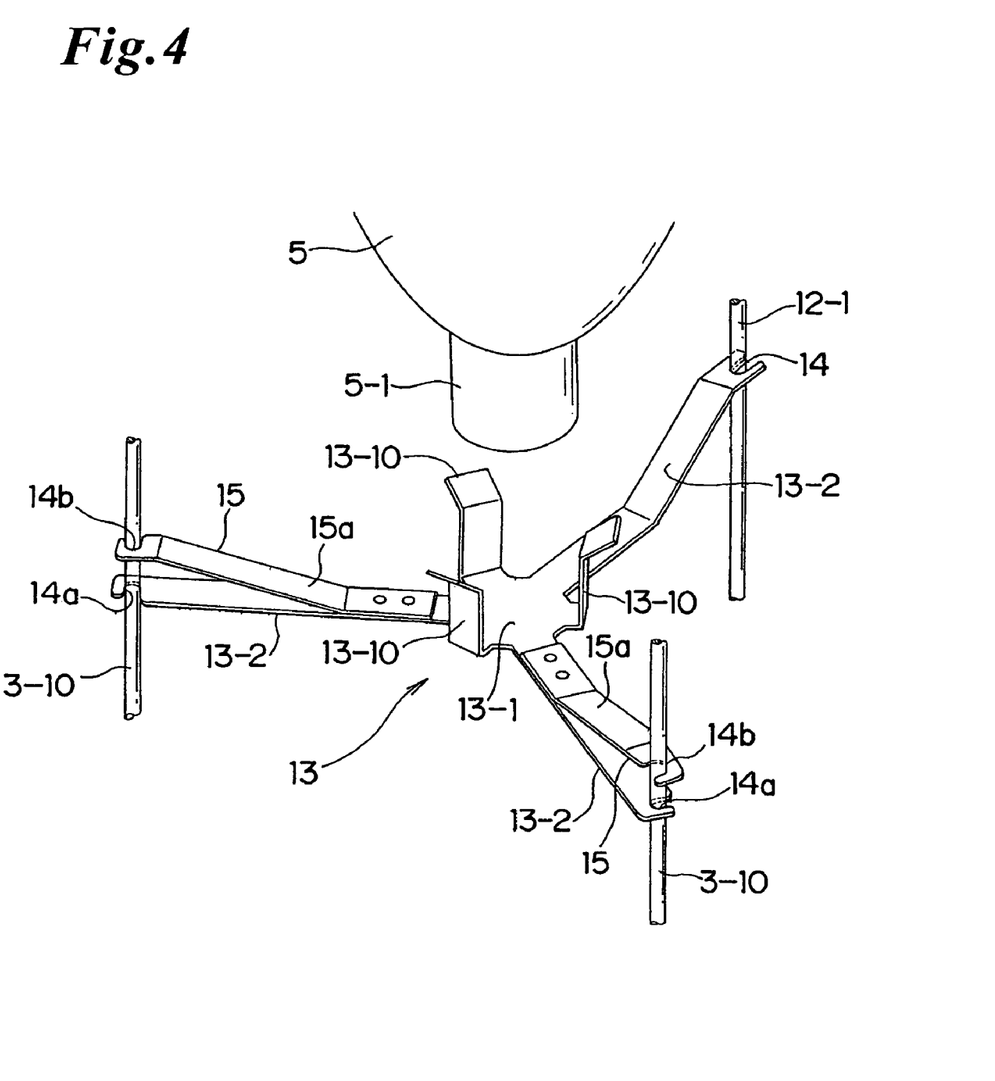
FIG. 4 is a perspective view for showing a relation between an electric bulb and an electric bulb-holding member.

As shown in FIGS. 3 and 4, the bulb holder 13 is made such that an extremity end protrusion 5-1 is fitted from above to inner end portions of three engaging arm pieces 13-2 arranged to extend in a radial direction from the central part of the frame body 3-1 toward either the upward rods 10 in an upward rod 12-1 of the opening or closing door 12 so as to form a holding part 13-1 for holding the electric bulb 5, a side edge at an outer end portion of each of the engaging arm pieces 13-2 is provided with an engaging notch 14a slidably engaged with either the upward rods 3-10 or the upward rod 12-1, and further the engaging arm pieces 13-2 of double directions engaged with the upward rods 3-10 are provided with engaging pieces 15 which are fixed at their inner ends to the engaging arm pieces 13-2 and engaged with the upward rods at their outer ends in such a way that they can be engaged with or disengaged from them.

The engaging pieces 15 are composed of spring plate members, wherein an outside part of the inner end portion fixed to the engaging arm piece 13-2 is applied as an inclined part 15a bent with its outer end part becoming an upper level, and a side edge of the outer end part is provided with an engaging notch 14b engaged with the upward rod 3-10 in such a way that it is faced reverse to that of the engaging notch 14a. In this way, under a state shown in FIGS. 2 and 4, the engaging notch 14b is press contacted with the upward rod 3-10 by a spring action of the inclined part 15a so as to restrict an upward or downward sliding of the bulb holder 13 and in turn when the inclined part 15a is pushed toward the engaging arm piece 13-2, the spring action does not occur to enable the bulb holder 13 to slide in an upward or downward direction, and the bulb holder 13 can be engaged at a proper position where the electric bulb 5 held in a downward direction can be held.

Figure 8:
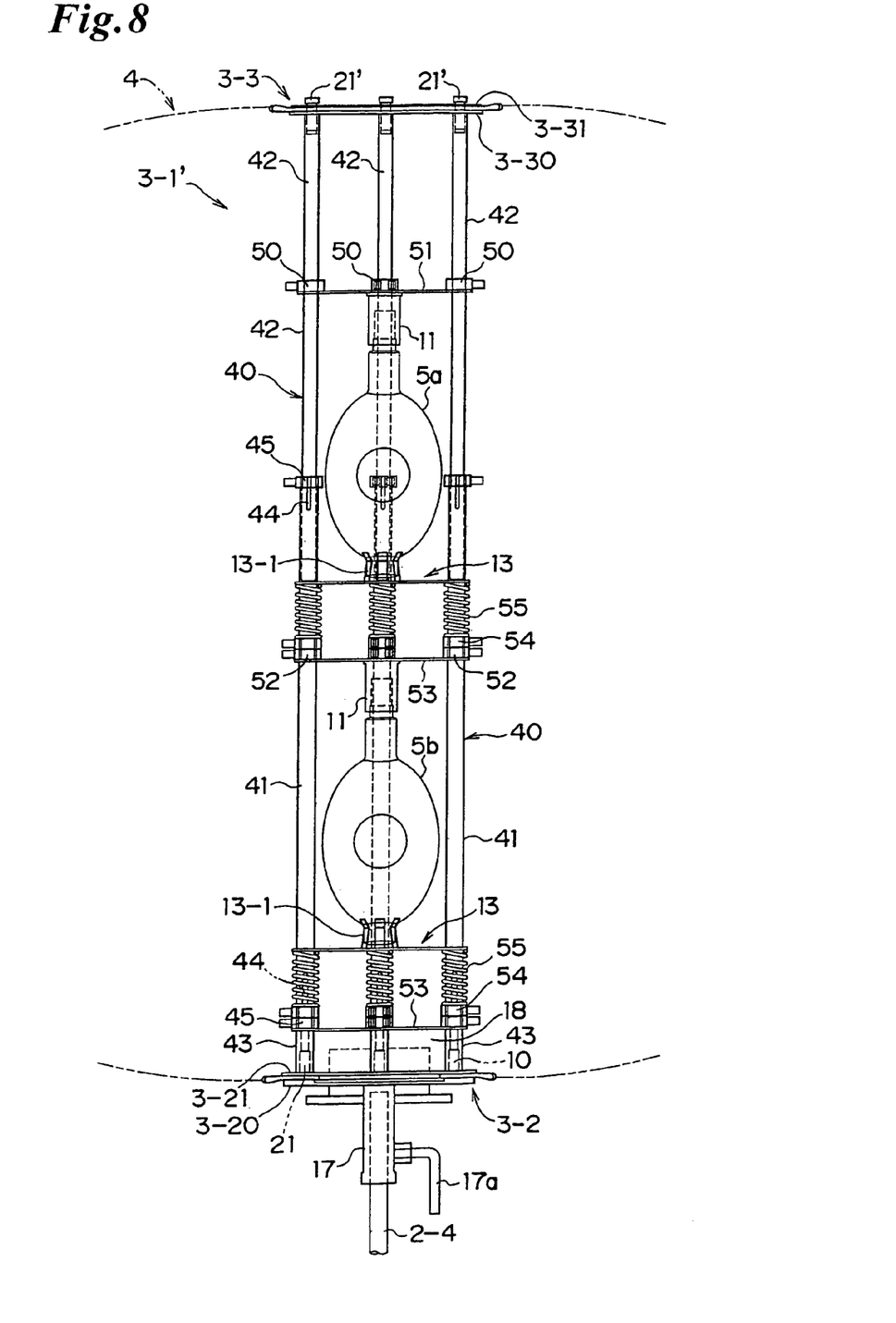
FIG. 8 is an enlarged longitudinal view in section of a central part of the balloon for showing an example in which the frame body of the lighting instrument is a supporting column structure.
Figure 10:
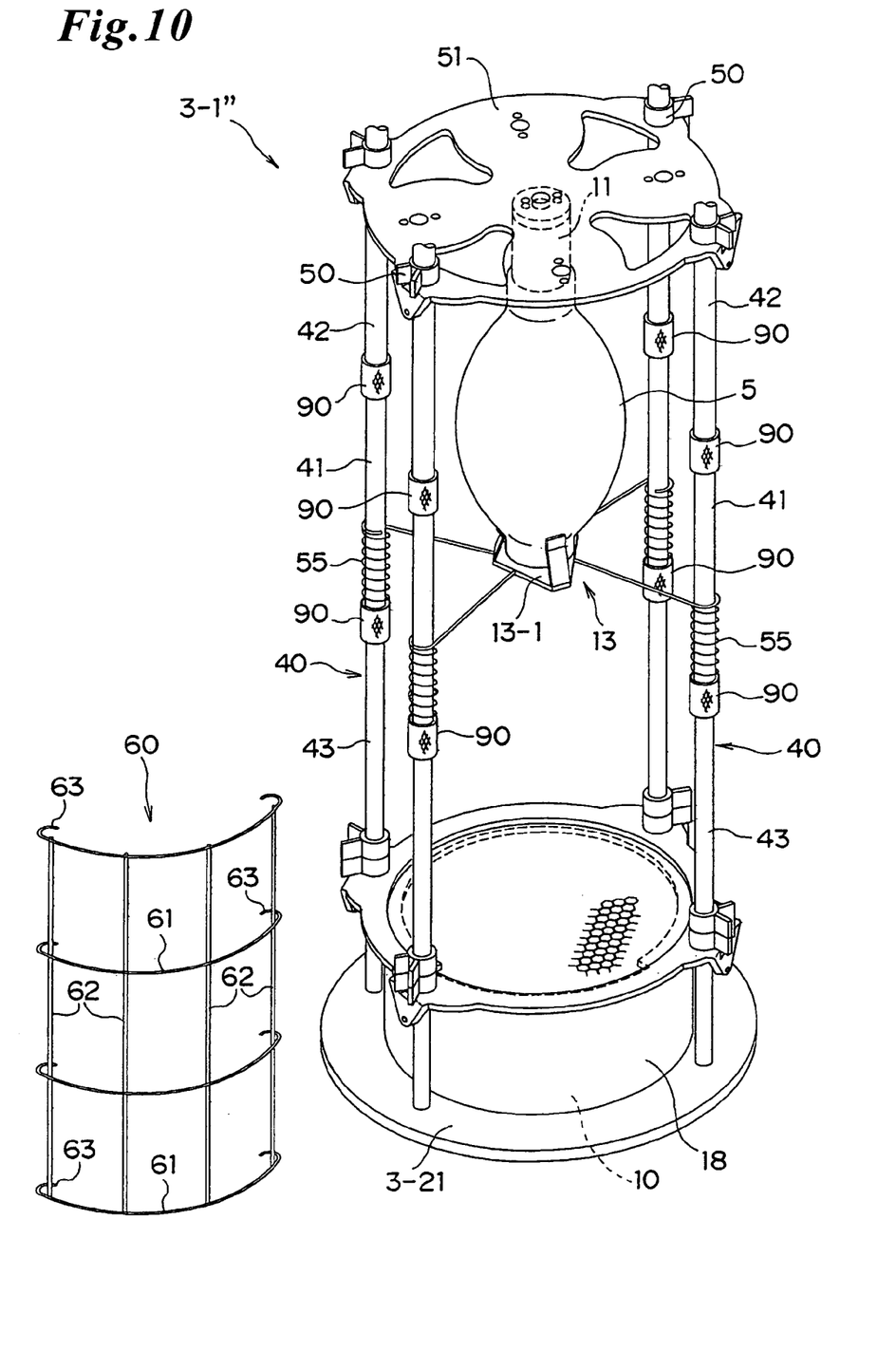
FIG. 10 is a perspective view for showing another example of the frame body acting as a column structure.

Further, means for engaging the bulb holder 13 at a proper height position is not limited to a form using the engaging pieces 15 described above, but it may also be applicable that as shown in FIG. 8 or FIG. 10, for example, each of the upward rods (supporting columns) of the frame body is provided with a spring 55, its repelling force is utilized to bias the electric bulb holder 13 in an upward direction and to be held at a proper height position.

The lower supporting member 3-2 fixed to the lower part of the frame body 3-1 is comprised of an outer plate 3-20 arranged outside the balloon 4 and an inner plate 3-21 cooperatively arranged at a lower end of the frame body 3-1. An outer skin of the balloon 4 is held at an inner side and an outer side of the balloon 4 by these outer plate 3-20 and inner plate 3-21 through an inside seal member 20 and an outside seal member 20, and the outer plate 3-20 is connected to the inner plate 3-21 with bolts 21 to cause a central location at the lower surface of the balloon 4 to be tightly fixed at the lower part of the frame body 3-1 under no air leakage state.

The outer plate 3-20 is a disk plate made of desired metal or hard synthetic resin and the like. An upper end portion of the connecting column 2-4 described above is inserted into an insertion cylinder 17 fixed to its lower surface side and the inserted state is fixed with a stopper member 17a such as a bolt and the like so as to fix the frame body 3-1 to the upper end of the connecting column 2-4 in its upright installed state.

The inner plate 3-21 is a disk plate made of the same quality material as that of the outer plate 3-20. A cylindrical casing 18 is fixed to its upper surface side and at the same time a connecting plate 19 fixed to the lower end of the frame body 3-1 is fixed to the upper surface of the casing 18.

The air suction device 10 acting as the balloon bulging-out means composed of a fan motor is mounted at the upper surface of a connecting plate 19. Under an action of the air suction device 10, surrounding air is fed into the balloon 4 through aeration holes 22 formed at the outer plate 3-20, the inner plate 3-21 and the connecting plate 19 and through the casing 18 so as to bulge out the balloon 4.

The upper supporting member 3-3 fixed to the upper part of the frame body 3-1 is comprised of an outer plate 3-31 and an inner plate 3-30 cooperatively arranged at an upper end part of the frame body 3-1. The outer skin of the balloon 4 is held at its inner side and outer side of the balloon 4 by these outer plate 3-31 and inner plate 3-30 through the inside seal member 20 and the outside seal member 20, and the outer plate 3-31 is fastened onto the upper part of the frame body 3-1 with bolts 21' at the inner plate 3-30, the central location of the upper surface of the balloon 4 is rigidly fixed to the upper part of the frame body 3-1 under no air leakage.

The inner plate 3-30 and the outer plate 3-31 are disk plates made of desired metal or hard synthetic resin and the like. The inner plate 3-30 is connected to a connecting plate 23 fixed to the upper end of the frame body 3-1.

The socket 11 for the electric bulb 5 and a protection cylinder 24 for protecting the socket 11 are fixed to the lower surface of the connecting plate 23.

The balloon 4 is not limited in particular if it is an item which can dampen light got from the electric bulb 5, supply air inside the balloon and can be bulged out into a desired shape. However, in the case of the example in this invention, there is applied a balloon having a substantial lateral long ellipsoidal shape composed of an outer skin such as a cloth or a synthetic resin film or the like. As described above, the lower surface at the central location of the balloon 4 is held by the lower supporting member 3-2 and its upper surface is held by the upper supporting member 3-3, respectively, and the frame body 3-1 is held by the lower supporting member 3-2 and the upper supporting member 3-3 and rigidly fixed to the upper and lower ends of the frame body 3-1.

At the inner central position of the balloon 4, the electric bulb 5 is held in the frame body 3-1 in a downward facing direction and at the same time the lighting instrument 3 provided with the air suction device 10 at its lower part is arranged in a storing state, the air suction device 10 is operated through supplying electricity from the power generator 6 to bulge out the balloon 4 and the electric bulb 5 is lit.

In accordance with the light projector of this example constructed as described above, when the electric bulb 5 is lit, the light is changed into a soft feeling light through the balloon 4 and the light can be projected against the outer entire circumferential direction of the balloon 4, so that glaring is not felt and the light can be radiated over a wide range. In addition, when a lighting place is to be changed at a work site and the like, the power generator 6, the extendable or retractable supporting column 2, the lighting instrument 3 and the balloon 4 can be moved together and their handling can be easily carried out and they can be installed at optional locations.

In addition, since the opposing location at the balloon 4, i.e. the central location of the upper surface and the central location of the lower surface of the balloon 4 are rigidly fixed to the upper part and the lower part of the frame body 3-1 by the upper supporting member 3-3 and the lower supporting member 3-2 installed at the frame body 3-1 of the lighting instrument 3, the bulged-out state of the balloon 4 can be held as much as possible even if the balloon 4 is swung with a strong wind, for example.

Further, since there is provided a holding type fixed structure in which the outer skin at the opposing location in the balloon 4 is held by the surfaces of these plates under application of the outer plates 3-20, 3-31 and the inner plates 3-21, 3-30, there occurs no possibility that the balloon is broken or formed with holes at a fixing portion for the balloon 4 and thus it is possible that the balloon 4 can be rigidly held.

In addition, since the electric bulb 5 is held in the frame body 3-1 in a downward facing manner, it is possible to avoid a possibility that rain water and the like enters the socket 11 and a water-proof characteristic can be improved.

When a filament of the electric bulb 5 is cut, the opening or closing door 12 around the frame body 3-1 is opened to enable a replacement of the electric bulb to be easily carried out.

Since there is employed a holding structure in which the electric bulb is held by the electric bulb holder 13, it is possible to prevent an installed state of the electric bulb 5 against the socket 11 from being loosened and to attain its use with peace of mind.

Figure 5:
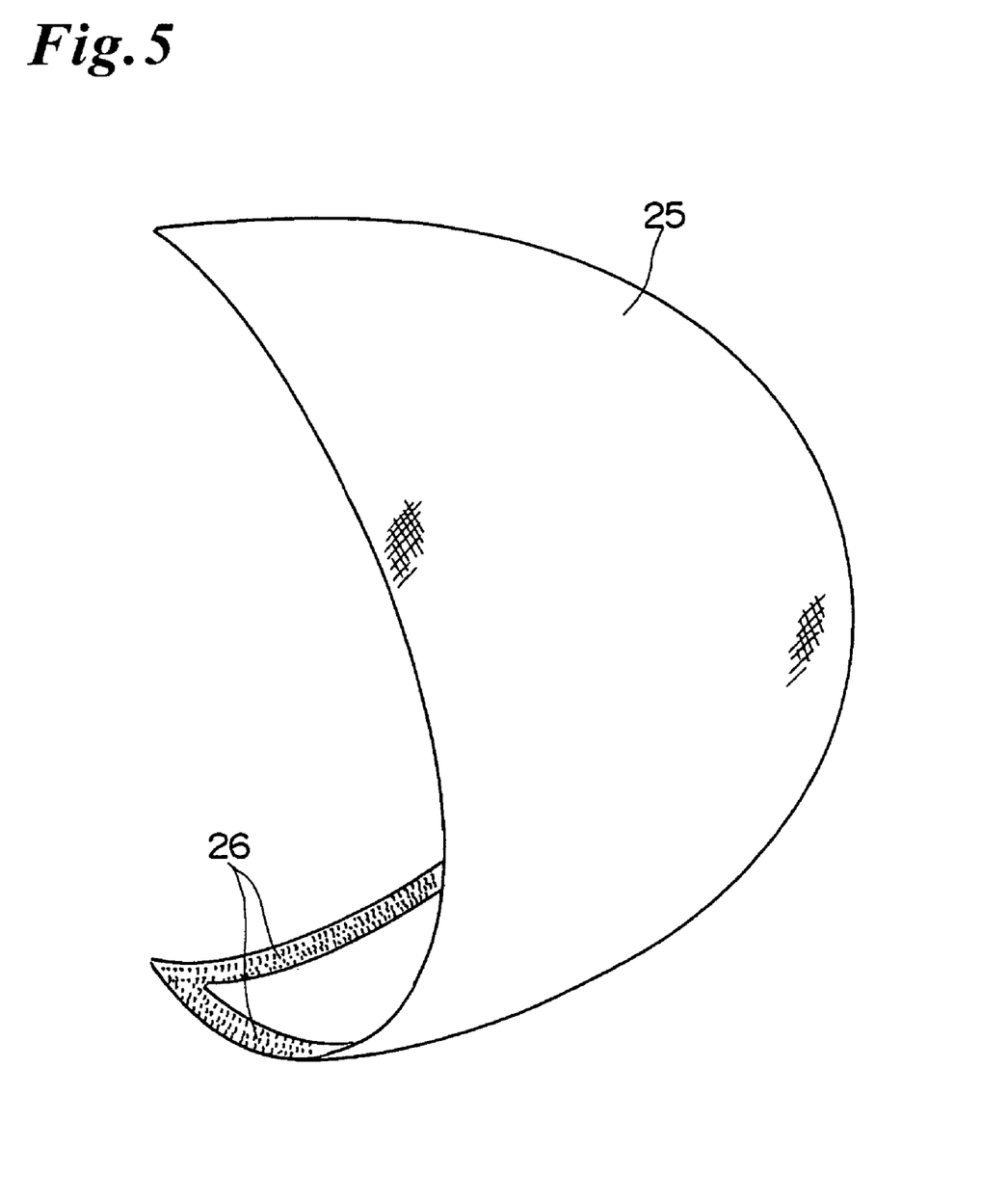
FIG. 5 is a perspective view for showing one example of a shielding film installed outside the balloon.
Figure 6:
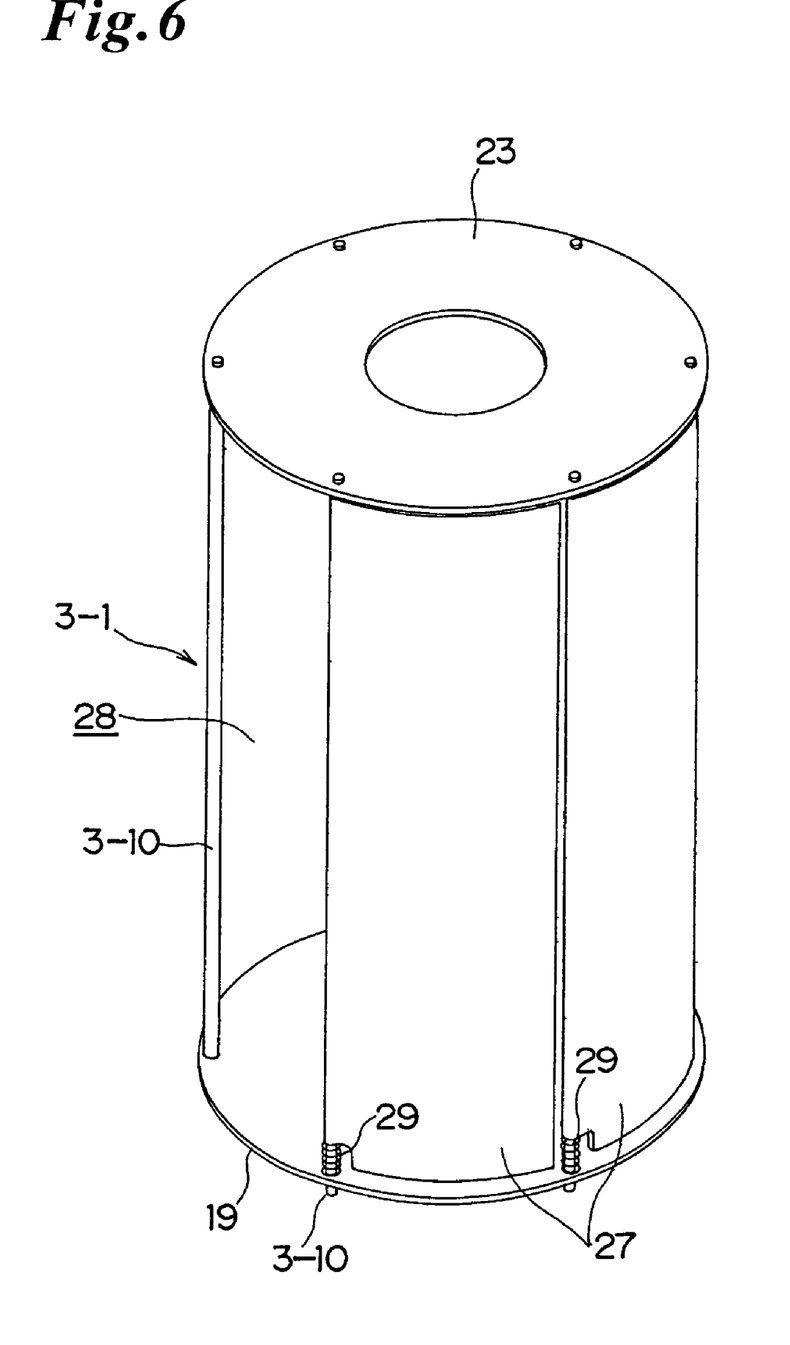
FIG. 6 is a perspective view for showing an example in which louvers are installed at the frame body of the lighting instrument.
Figure 7:
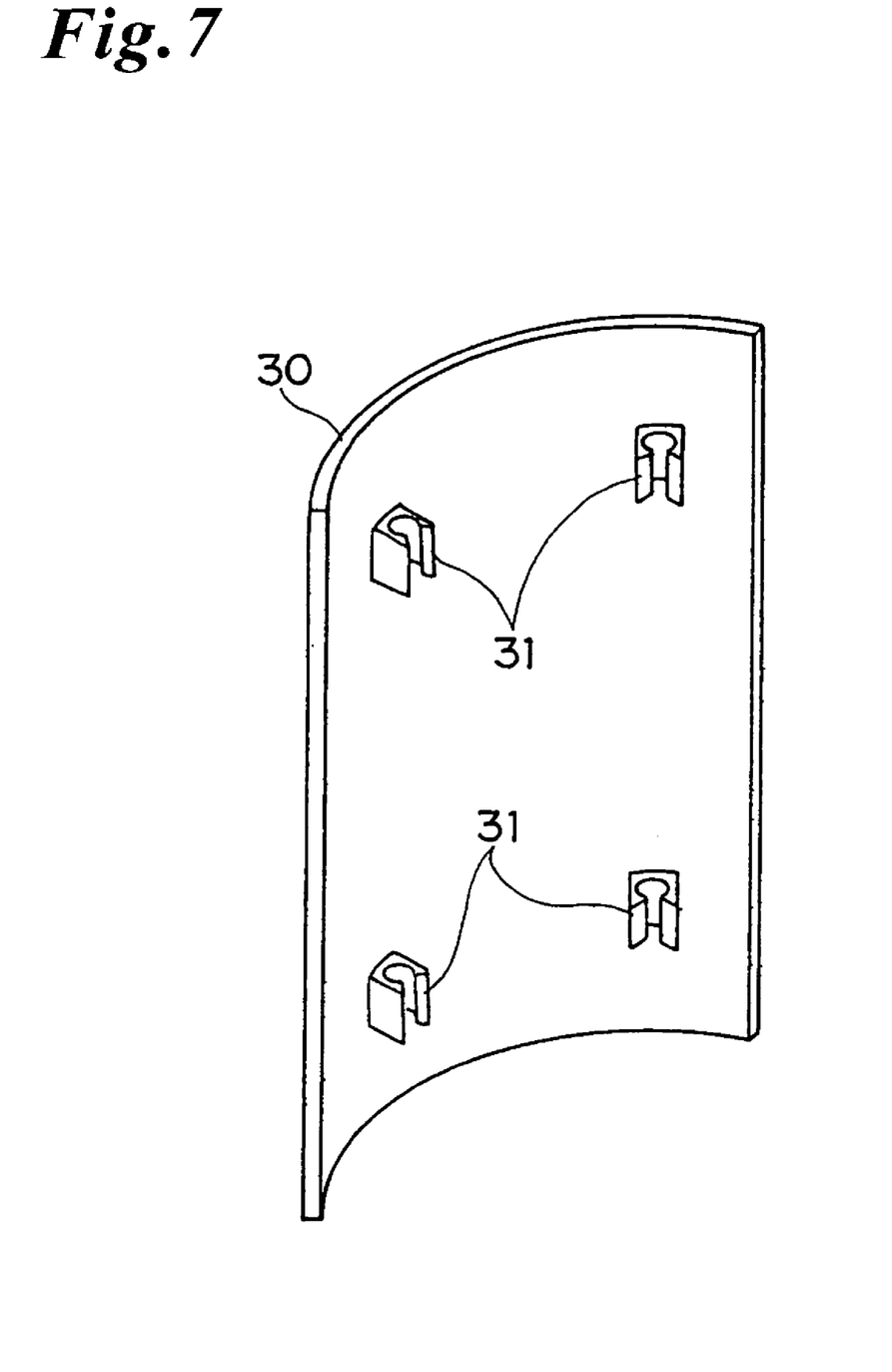
FIG. 7 is a perspective view for showing an example of a shielding plate installed at the frame body of the lighting instrument.

FIGS. 5 to 7 illustrate light shielding members for restricting a light projecting range by the aforesaid balloon 4. These light shielding members are properly installed outside or inside the balloon 4 to make a partial shielding of a light projecting direction from the balloon 4 in the case that leakage of light to a civilian house at a working site near the civilian house may cause a trouble to the civilian house and to restrict the light projecting range.

The light shielding member shown in FIG. 5 is a covering film 25 having a light shielding characteristic. One or a plurality of covering films 25 can be properly installed outside the balloon 4. If the material does not pass the light from the electric bulb 5, the material of the covering film 25 is not particularly restricted. However, it is preferable to apply either a thin fabric or a thin synthetic resin sheet or film having a flexibility which can be easily installed along the outside part of the bulged-out balloon 4, for example.

This covering film 25 is formed into such a shape as shown in FIG. 5, for example, one of a pair of male or female velvet fasteners 26 (for example, a male side) is fixed by sewing or adhesion or other desired fixing means along an edge part of the inner surface side, the other fastener (for example, a female side) is fixed along the outer surface of the balloon 4 in response to either a size or shape of the covering film 25, one or several covering films 25 are optionally installed at an outside location of the balloon 4 through an engaged or disengaged connection of the velvet fasteners 26, thereby the light projecting direction of the balloon 4 is optionally set.

As means for removably fixing the covering film 25 to the outside of the balloon 4, it is not limited to application of the velvet fasteners 26 and it is satisfactory if the means such as hooks and buttons or the like capable of rigidly fastening the covering film 25 to the outside part of the balloon 4 and capable of being easily engaged with or disengaged from the balloon is applied.

In FIG. 6 is illustrated an example in which the frame body 3-1 of the aforesaid lighting instrument 3 is formed only with some straight upward rods 3-10 and at the same time the louvers 27 acting as the light shielding members are installed at each of the upward rods 3-10 in such a way that they can be opened or closed.

That is, the upward rods 3-10 in this example are vertically installed in an equal space at outer edges of the connecting plates 19, 23 over the connecting plate 19 at the side of the aforesaid lower supporting member 3-2 and the connecting plate 23 at the upper supporting member 3-3 so as to form the frame body 3-1 and at the same time the louvers 27 curved in an arcuate shape are installed at openings 28 of the adjoining upward rods 3-10 themselves. The louvers 27 have their side edges pivotally supported at the upward rods 3-10 and rotatably supported there.

In accordance with this example, each one of or several louvers 27 is rotatably installed at each of the openings 28 at the frame body 3-1, the opening 28 at an optional location is closed by the louver 27 to prevent light got from the electric bulb 5 from partially leaked out of the balloon. Then, the light from the electric bulb 5 is not radiated from the opening 28 between each of the upward rods 3-10 of the frame body 3-1 closed by the louvers 27, the light is radiated from the opening 28 between each of the upward rods 3-10, 3-10 not provided with the louvers 27 to enable the light projecting direction with the balloon 4 can be optionally set.

When the light projector is used at a work site far from a civil house and the like (when a light projecting direction is not needed to be restricted), each of the louvers 27 is rotated to open all the openings 28 to enable the light from the electric bulb 5 to be radiated against the outside entire circumferential direction of the balloon 4.

Reference numeral 29 in FIG. 6 denotes each of spring members installed at the upward rods 3-10 having the louvers 27 rotatably and pivotally supported. The repelling force of the spring members 29 biases the louvers 27 in a closing direction or an opening direction.

In FIG. 7 is illustrated a covering plate 30 acting as a light shielding member which is removably installed between the adjoining upward rods 3-10 and 3-10 of the frame body 3-1 shown in FIG. 6 in place of the aforesaid louvers 27. This covering plate 30 is provided with engagement members 31 removably engaged between the adjoining upward rods 3-10, 3-10 at a rear side of the arcuate curved plate covering the aforesaid openings 28. This covering plate is constructed such that one or several covering plates 30 are prepared in advance, the opening 28 at optional location is closed by the covering plate 30 to prevent the light of the electric bulb 5 from being radiated at the opening 28, the light is radiated from the opening 28 where the covering plate 30 is not installed and the light projecting direction can be optionally set through the balloon 4.

Figure 9:
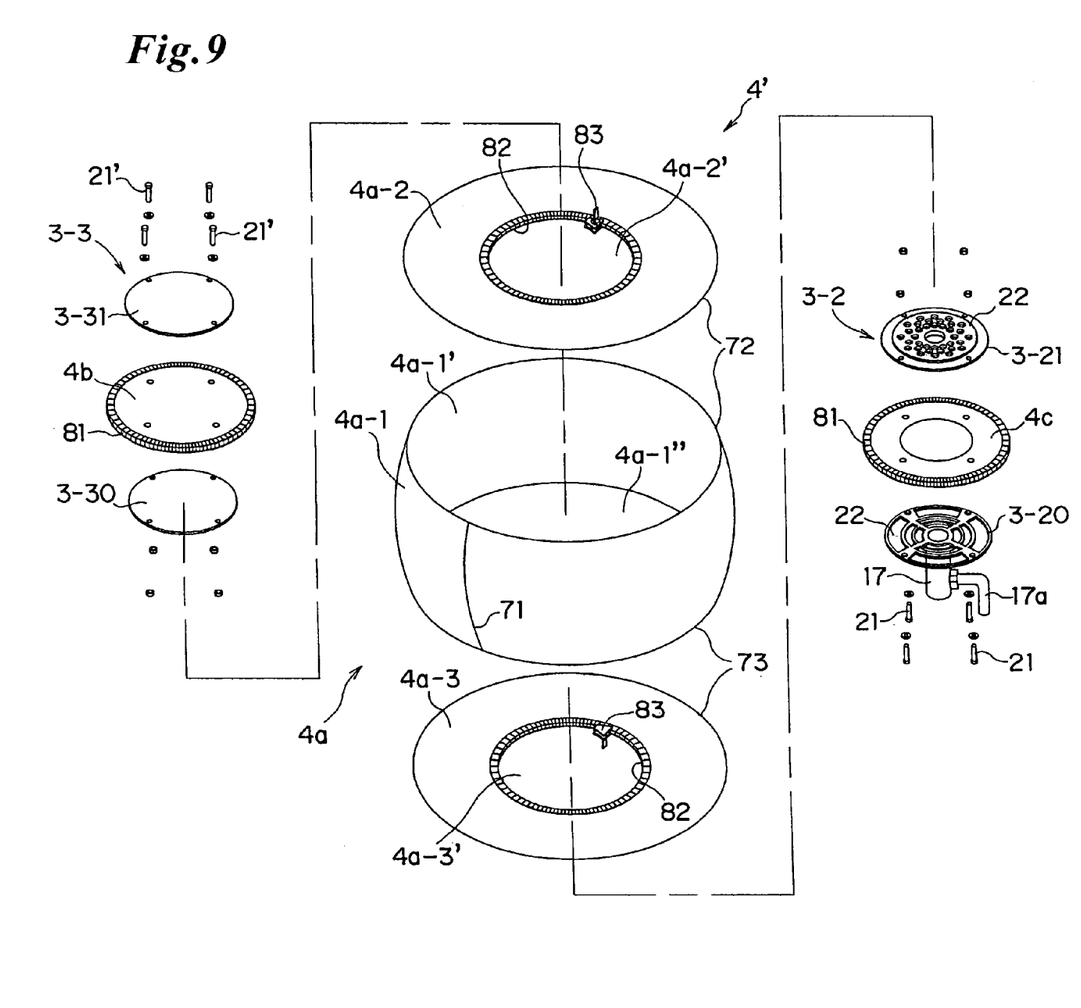
FIG. 9 is an exploded perspective view for showing a balloon comprised of three segments.

In each of FIGS. 8 to 10 is shown an example in which the structures of the frame body 3-1 of the aforesaid lighting instrument 3 and the balloon 4 are changed, respectively.

A frame body 3-1' shown in FIG. 8 has a supporting column structure of high strength in which a plurality of supporting columns 40 are raised between the upper part and the lower part of the frame body.

That is, this frame body 3-1' is made such that four supporting columns 40 are vertically arranged between the inner plate 3-21 of the lower supporting member 3-2 and the inner plate 3-30 of the upper supporting member 3-3. These supporting columns 40 are raised in every equal space at the outer edges of each of the aforesaid inner plates 3-21, 3-30.

Each of the supporting columns 40 is comprised of three columns made of metal or synthetic resin. A middle column 41 acting as the first column is provided with an upper column 42 acting as a second column having a smaller diameter than that of the middle column 41 and a lower column 43 acting as a third column. The upper column 42 is slidably inserted into the middle column 41 at the upper end part of the middle column 41, and the lower column 43 is slidably inserted into the middle column 41 at the lower end of the middle column 41, respectively, so as to cause a length of the supporting column to be adjustable.

More in detail, each of the upper end and lower end of each of the middle columns 41 is provided with a slit groove 44, a diameter of the slit groove,is made to be expanded or retracted and at the same time a fastening band 45 is installed there, fastening of the fastening band 45 causes the diameters of the upper end and the lower end of the middle column 41 to be optionally shrunk to restrict a sliding motion of the upper column 42 and the lower column 43, a protruding size of each of the upper column 42 and the lower column 43 in respect to the middle column 41 is optionally adjusted and a length of each of the supporting columns 40 can be adjusted.

With such an arrangement as above, since it is possible to set a height size of the frame body 3-1' optionally, it is possible to improve a storing characteristic by shrinking the frame body 3-1' and reducing a size of the lighting instrument and further it is possible to fix another balloon having different shapes and sizes and the like.

The upper column 42 is fixed to the inner plate 3-30 by bolts 21' for use in fixing the outer plate 3-31 of the upper supporting member 3-3 to the inner plate 3-30. The lower column 43 is fixed to the inner plate 3-21 by bolts 21 for use in fixing the outer plate 3-20 of the lower supporting member 3-2 to the inner plate 3-20.

An upper socket plate 51 is installed at the upper column 42 of each of the supporting columns 40 in such a way that it can be slid in an upward or downward direction, and the socket 11 is arranged at the lower surface of the upper socket plate 51 and an electric bulb 5a is installed while being faced downward to enable the position of the electric bulb 5a to be adjusted in an upward or downward direction. The upper socket plate 51 is fixed to a fastening band 50 of which fixing position can be changed in respect to each of the upper columns 42.

In addition, the middle column 41 of each of the supporting columns 40 is provided with a lower socket plate 53 in such a way that it can be slid in an upward or downward direction. The lower surface of the lower socket plate 53 is provided with the socket 11 to cause an electric bulb 5b to be installed while being faced downward, thereby the position of the electric bulb 5b can be adjusted in an upward or downward direction. The lower socket plate 53 is fixed to a fastening band 52 installed in such a way that its fixing position can be changed.

The electric bulb holder 13 for holding each of the aforesaid electric bulbs 5a, 5b is installed at the middle column 41 in such a way that it can be slid in an upward or downward direction. The electric bulb holder 13 is biased upwardly by a spring 55 held by a fastening band 54 of which fixing position can be freely changed against the middle column 41 and fixed at a proper height position where the electric bulbs 5a, 5b can be held.

In this way, each of the height positions of the electric bulb 5a and the electric bulb 5b can be separately adjusted and the position of the light source can be set properly in response to a shape or a size of the balloon. In addition, each of the height positions of the electric bulb holders 13 can be separately adjusted and each of the electric bulbs 5a, 5b of which height positions have been changed can be held by each of the electric bulb holders 13, respectively.

A protecting frame 60 shown in FIG. 10 is installed between the adjoining supporting columns 40, 40 of the frame body 3-1'. The protecting frame 60 is composed of a metal net-like frame member where a plurality of arcuate curved lateral wire members 61 and linear upward wire members 62 are combined to each other. Both right and left end portions of the lateral wire members 61 are bent inwardly to form hook parts 63, each of the hook parts 63 is resiliently engaged with the supporting columns 40 and each of the hooks is removably installed between the adjoining supporting columns 40, 40.

In FIG. 9 is illustrated a balloon 4' composed of three segments, i.e. a barrel part 4a, an upper surface part 4b and a lower surface part 4c. In detail, the barrel part 4a is formed by a cylindrical sheet member 4a-1 made of sheet material formed into a cylindrical shape while both end edges of the sheet of lateral long rectangular shape made of nylon etc. for example having a desired light shielding characteristic, anti-weather characteristic and durability are fixed by sewing and adhering or the like with its upper part and lower part being opened; an upper circular sheet member 4a-2 formed into a circular shape with the same sheet material as that of the cylindrical sheet member 4a-1 and fixed by sewing and adhering or the like to the opening edge to close the upper opening surface 4a-1' and the lower opening surface 4a-1" of the cylindrical sheet member 4a-1; and a lower circular sheet member 4a-3. The upper surface 4b and the lower surface 4c composed of the same quality sheet material as that of the cylindrical sheet member 4a-1 are removably attached to openings 4a-2', 4a-3' arranged at the upper circular sheet member 4a-2 and the lower circular sheet member 4a-3.

The barrel part 4a is formed by three fixing segments, i.e. a fixed segment 71 such as sewing and adhering or the like at the cylindrical sheet member 4a-1; and fixing segments 72, 73 such as sewing and adhering or the like of the upper circular sheet member 4a-2, the lower circular sheet member 4a-3 in respect to the upper opening surface 4a-1', the lower opening surface 4a-1" to enable the circular cylindrical balloon 4' not producing any wrinkles to be formed.

Further, a shape of the balloon 4' can be applied in various kinds of shape such as a substantial lateral elongated drum shape, a substantial truncated cone shape, an inverse truncated cone shape, a figure, an animal, a building and character other than the substantial upward longitudinal drum shape shown.

Further, the balloon 4' in this example is fixed in such a way that the upper surface 4b is held by the outer plate 3-31 and the inner plate 3-30; the lower surface 4c is held by the outer plate 3-20 and the inner plate 3-21 of the lower supporting member 3-2; and the barrel part 4a is removably attached by arranging an engaging means 80 to enable the openings 4a-2', 4a-3' arranged at the centers of the upper circular sheet member 4a-2 and the lower circular sheet member 4a-3 to be engaged with or disengaged from each of these upper surface 4b and lower surface 4c, respectively.

The engagement means 80 in this example is a fastener type connecting means opened or closed under an operation provided from outside to the balloon 4', and more particularly, the upper surface 4b and the lower surface 4c are formed into a circular sheet state as shown in FIG. 9, an annular row of teeth 81 composed of one of the male or female teeth rows of the fastener is formed at an outer circumferential portion, and in turn an annular row of teeth 82 composed of the other of the male or female teeth rows of the fastener is formed along the opening edges of the openings 4*a*-2', 4*a*-3', an opening or closing fitting 83 is slidably attached to one of the rows of teeth, and both teeth rows 81, 82 are connected or separated through a sliding operation of the opening or closing fitting 83.

Although not shown in FIG. 9, either the aforesaid frame body 3-1 or 3-1' is arranged between each of the inner plates 3-21, 3-30 of the lower supporting member 3-2 and the upper supporting member 3-3.

Then, under a state in which the annular row of teeth 81 and the annular row of teeth 82 are connected to each other (the state in which the fastener is closed), the barrel 4*a* of the balloon 4' is connected to the upper surface 4*b* and the lower surface 4*c*, and under this state, the balloon 4' is rigidly fixed to either the frame body 3-1 or 3-1'. In addition, when the opening or closing fitting 83 is slid in the opening direction from this state to cause the annular row of teeth 81 to be separated from the annular row of teeth 82 (the fastener is opened), the upper surface 4*b* and the lower surface 4*c* are left at the upper part and the lower part of the frame body 3-1 or 3-1' and then the barrel part 4*a* of the balloon 4' can be easily removed from either the frame body 3-1 or 3-1'. With such an arrangement as above, it is possible to perform a replacement of the barrel 4*a* or replacement of the electric bulbs 5, 5*a* and 5*b* and a height adjustment work for the frame body 3-1' in an easy manner. Additionally, it is also possible that other barrels having different shapes and different sizes are replaced with the former barrel and installed. In this case, the framebody 3-1' shown in FIG. 3 is applied to enable the height size of the frame body 3-1' or positions of the electric bulbs 5*a*, 5*b* can be properly adjusted in compliance with the barrels.

In the case of example shown in FIG. 9, the upper surface 4*b* and the lower surface 4*c* of the balloon 4' are removably attached to the barrel 4*a* by the fastener type connecting means. However, this invention is not limited to this arrangement. For example, the aforesaid cylindrical sheet member 4*a*-1 is applied as a barrel of the balloon, the annular row of teeth 81 composed of one row of male or female teeth is formed at opening edges of the upper opening surface 4*a*-1' and the lower opening surface 4*a*-1" of the barrel and in turn, the circular sheet members 4*a*-2, 4*a*-3 closing the upper opening surface 4*a*-1' and the lower opening surface 4*a*-1" are applied as an upper surface and a lower surface of the balloon. The annular row of teeth 82 composed of the other row of male or female teeth of the fastener is formed at the outer circumferential portions of the upper surface and the lower surface. The opening or closing fitting 83 is slidably attached to any one of the rows of teeth, the upper surface and the lower surface composed of the circular sheet members 4*a*-2, 4*a*-3 are removably attached to the barrel composed of the cylindrical sheet member 4*a*-1.

In addition, the engagement means is not limited to the aforesaid fastener-type connecting means, but it is possible to apply various kinds of engagement means such as hooks and buttons where the male member and the female member are engaged to each other.

The frame body 3-1" shown in FIG. 10 is provided with a collet nut 90 acting as a member for restricting the sliding motion of the upper column 42 and the lower column 43 inserted into the middle column 41 in place of the fastening band 45 for the frame body 3-1' shown in FIG. 8. Other composing elements than the foregoing are similar to the elements described above, so that their duplex description will be eliminated.

Several examples of preferred embodiments of the light projector of this invention have been described in reference to the drawings. This invention is not restricted by the illustrated example It is of course apparent that various kinds of modifications can be carried out within a scope of the technical concept described in each of the claims.

Industrial Applicability of the Invention

The light projector of this invention has been constituted as described above, so that the light from the light projector is passed through the balloon to enable the light to be changed into a light not feeling a glare and radiated in a soft light and the light can be radiated against the outer entire circumferential direction of the balloon.

The invention claimed is:

1. A light projector comprised of a power generator; a bogie for mounting said power generator; an extendable or retractable supporting column vertically arranged at said bogie; a frame body located at an upper end of said supporting column, said frame comprising an upper part and a lower part and a plurality of supporting columns raised between the upper part and the lower part; a flexible balloon mounted on said frame body; and a lighting instrument supported by said frame body, wherein said power generator and lighting instrument can be electrically energized, said balloon comprising of an upper surface part, a barrel part and a lower surface part, and said upper surface part and said lower surface part being releasably attached to said barrel part.

2. A light projector according to claim 1, wherein said lighting instrument is comprised of an electric bulb; and a balloon bulging-out means for bulging out said balloon, and including an upper supporting member and a lower supporting member for holding said balloon, said frame body being held by said upper supporting member and said lower supporting member.

3. A light projector according to claim 2, wherein said upper supporting member and said lower supporting member are comprised of an inner plate arranged inside said balloon and an outer plate arranged outside said balloon.

4. A light projector according to claim 1, wherein each of the supporting columns of said frame body is comprised of at least a first column and a second column having a smaller diameter than that of said first column, and said second column is slidably inserted into said first column.

5. A light projector according to claim 1, further including at least one covering film having a light-shielding characteristic removably and properly installed at a location outside said balloon.

6. A light projector comprised of a power generator; a bogie for mounting said power generator; an extendable or retractable supporting column vertically arranged at said bogie; a frame body located at an upper end of said supporting column; a flexible balloon mounted on said frame body; and a lighting instrument supported by said frame body, wherein said power generator and lighting instrument can be electrically energized, said balloon comprising of an upper surface part, a barrel cart and a lower surface part, said upper surface part and said lower surface part being releasably attached to said barrel part, and wherein said upper and lower surface parts are releasably attached to said barrel part by respective zipper means.

* * * * *